United States Patent
Belart et al.

[11] 3,797,246
[45] Mar. 19, 1974

[54] MULTI-CIRCUIT BRAKE SYSTEM

[75] Inventors: Juan Belart, Walldorf; Hans-Albert Beller, Bad Vilbel; Jochen Burgdorf, Offenbach, all of Germany

[73] Assignee: ITT Industries, Inc., New York, N.Y.

[22] Filed: Oct. 18, 1972

[21] Appl. No.: 298,737

[30] Foreign Application Priority Data
Oct. 30, 1971 Germany.......................... 2154229

[52] U.S. Cl............................ 60/555, 60/547, 60/580
[51] Int. Cl............................................... F15b 7/00
[58] Field of Search........ 60/54.5 P, 54.6 P, 54.5 E, 60/54.6 E, 555, 580, 547; 188/345

[56] References Cited
UNITED STATES PATENTS

| | | | |
|---|---|---|---|
| 3,201,176 | 8/1965 | Hager | 60/54.5 P |
| 3,040,534 | 6/1962 | Hager | 60/54.6 E |
| 3,492,053 | 1/1970 | Wallis | 60/54.5 E |
| 2,670,603 | 3/1954 | Allin et al | 60/54.5 P |
| 2,762,199 | 9/1956 | Major | 60/54.6 E |
| 2,845,147 | 7/1958 | Hill | 60/54.6 P |
| 3,103,786 | 9/1963 | Hager | 60/54.6 P |

Primary Examiner—Edgar W. Geoghegan
Assistant Examiner—A. M. Zupcic
Attorney, Agent, or Firm—John T. O'Halloran; Menotti J. Lombardi, Jr.; Alfred C. Hill

[57] ABSTRACT

This relates to a power assisted multi-circuit brake system. The brake system includes a primary multi-circuit master cylinder, an intermediate master cylinder for each brake circuit, a brake booster common to each intermediate master cylinder and a control valve for the brake booster. As disclosed herein a single compact structural unit of reduced axial length is provided including the intermediate master cylinders and the brake booster. This is accomplished by placing the intermediate master cylinders and the brake booster in a parallel relationship with respect to each other in the compact structural unit. A single brake fluid reservoir can be employed for the intermediate master cylinders and the brake booster because the intermediate master cylinders are oriented with respect to the brake booster so that the intermediate master cylinder stroke is opposite to the brake booster stroke.

3 Claims, 4 Drawing Figures

MULTI-CIRCUIT BRAKE SYSTEM

BACKGROUND OF THE INVENTION

The invention relates to a multi-circuit brake system and more particularly to a power assisted multi-circuit brake system.

In a copending U.S. Pat. application of J. Burgdorf, Ser. No. 171,579 filed Aug. 12, 1971 there is disclosed a two brake circuit pedal master cylinder which provides brake fluid pressure for the control valve of a vacuum brake booster and two intermediate master cylinders each coupled in common to the brake booster and to a different one of two brake circuits. A single booster cylinder operated by the brake booster provides brake fluid pressure for the two intermediate master cylinders. The two intermediate master cylinders are integral in construction. A pair of blind bores are formed in a housing parallel to each other and the longitudinal axis of the housing. Each bore is part of a different intermediate master cylinder. Each bore is divided longitudinally into two chambers and filled with brake fluid. The first chamber of each bore includes a valve piston operated on hydraulically by the brake fluid pressure from the pedal master cylinder to activate the brake circuit associated with that particular intermediate master cylinder. The second chamber of each bore includes a secondary piston carrying a locking member mechanically operable on the associated valve piston when the booster cylinder applies brake fluid pressure to the secondary piston.

For cost reasons in multi-circuit brake system it is desirable to combine as many different components as possible into one structural unit. This enables achieving cheap manufacturing and assemblying.

From the above-cited copending application it is known to fuse the intermediate master cylinders into one structural unit. This unit is actuated hydraulically by the booster cylinder and, thus, can be arranged at will in the space available in the vehicle.

From the British Pat. No. 837,576 it is known to integrate a brake booster with its control valve and tandem intermediate master cylinder into a single structural unit, the tandem intermediate master cylinder being arranged coaxially with and at one end of the booster cylinder. This design has the disadvantage that its structural length is very large and for space reasons often makes an installation thereof in motor vehicles impossible.

SUMMARY OF THE INVENTION

An object of the present invention is to combine a booster including its booster cylinder with two intermediate master cylinders into one constructional unit so that the structural length is as short as possible and so that the necessary connections between the individual components are as short and as simple as possible.

A feature of the present invention is the provision of a multi-circuit brake system comprising: a multi-circuit pedal master cylinder; a vacuum brake booster including a pressure sensitive chamber, a pressure sensitive piston disposed in the chamber, a booster cylinder, a booster piston disposed in the booster cylinder, the booster piston being connected to the pressure sensitive piston to control the movement of the booster piston, and a booster control valve coupled to each circuit of the master cylinder and the chamber to control the movement of the pressure sensitive piston; a plurality of intermediate master cylinders each containing a control piston coupled to control wheel brake cylinders of a different one of the multi-circuits and coupled in common to the booster cylinder to enable the booster piston to control the movement of each of the control pistons; and a single structural unit containing the plurality of intermediate master cylinders and the booster cylinder, the plurality of intermediate master cylinders being disposed in the structural unit to have their longitudinal axis disposed in a parallel relationship with respect to each other and the longitudinal axis of the booster cylinder.

In accordance with the principles of the present invention there is provided a single structural unit including the intermediate master cylinder of each circuit of a multi-circuit brake system disposed in parallel relation with each other and the brake booster cylinder with the intermediate master cylinders being oriented with respect to the booster unit so that the stroke of the piston of each of the intermediate master cylinders is opposite to the stroke of the piston of the brake booster cylinder.

Another feature of the present invention is that the intermediate master cylinders and the booster cylinder are connected with one brake fluid reservoir by housing ducts.

Still another feature of the present invention is that the control valve for the brake booster is also integrated into the single structural brake unit.

The advantages of the present invention primarily consist in the compact construction of the single structural brake unit. The arrangement with the above described orientation of the intermediate master cylinders and the brake booster cylinder enables one single brake fluid reservoir, from which pressure medium ducts lead radially to the intermediate master cylinders and to the booster cylinder, to supply brake fluid for the intermediate master cylinders and the booster cylinder. The arrangement of the air outlet of the control valve implies that it rests in a sealed relation against a connection of the booster as soon as the single structural brake unit is screwed against the vacuum part of the brake booster.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
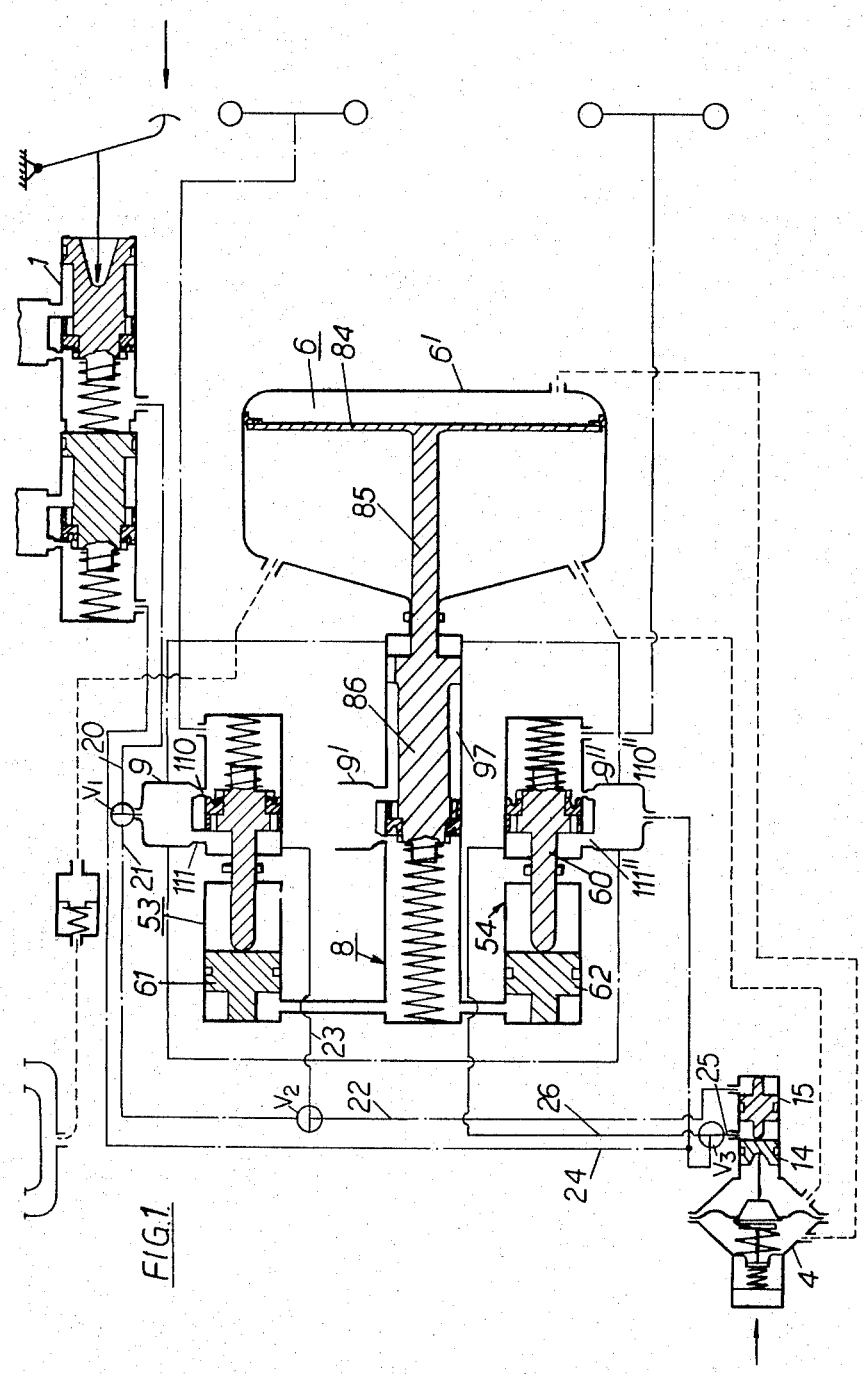
FIG. 1 illustrates a schematic operating diagram of the multi-circuit brake system in accordance with the principles of the present invention.

A multi-circuit (two circuit as illustrated) pedal master cylinder is marked 1 in FIG. 1. A brake booster 6 with a vacuum or pressure sensitive cylinder or chamber 6' and a booster or pressure sensitive piston 84 is connected via a push rod 85 with a booster cylinder piston 86 of a booster cylinder 8. Intermediate master cylinders 53 and 54 are arranged on both sides of the booster cylinder 8 with their longitudinal axis in parallel with each other and the longitudinal axis of booster cylinder 8.

The intermediate master cylinders each have a booster piston 61 and 62, respectively. Booster pistons 61 and 62 are actuated by the pressure medium displaced by booster piston 86. At the same time pistons 61 and 62 actuate the valve pistons 59 and 60, respectively.

According to the invention the intermediate master cylinders 53 and 54 are arranged or oriented in inverted direction with respect to the stroke of booster piston 86; i.e., upon a movement of booster piston 86 to the left booster pistons 61 and 62 with their associated valve pistons 59 and 60 move to the right.

FIG. 1 discloses two alternate ways of controlling control valve 4 of the brake booster system. In the first control arrangement for control valve 4 switching valves V1 is rotated counterclockwise as viewing FIG. 1 to connect line 20 to line 21 and disconnect line 20 from reservoir 9, switching valve V2 is rotated counterclockwise as viewing FIG. 1 to connect line 21 to line 22 and to disconnect line 23 from line 22 and switching valve V3 is rotated counterclockwise as viewing FIG. 1 to connect line 24 to line 25 and to disconnect line 26 from line 25. With this orientation of valves V1, V2 and V3, control valve 4 is controlled directly from master cylinder 1. The disadvantage of this first control arrangement is that the vehicle operator has no feel in the brake pedal of the brake process at the wheel brakes.

Figure 3:
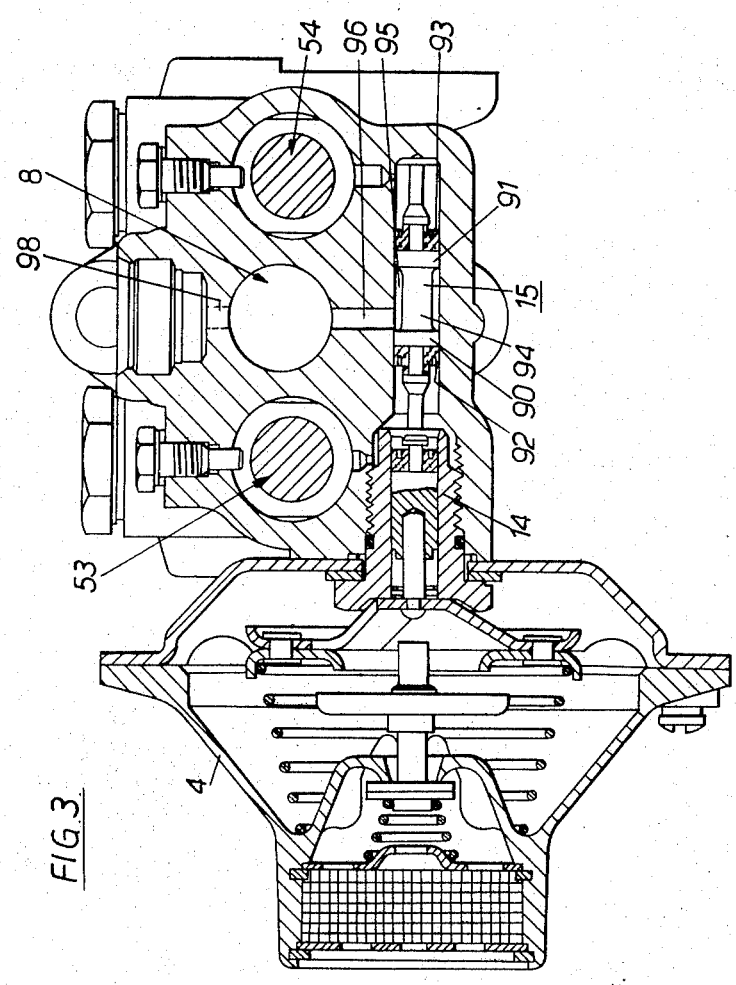
FIG. 3 illustrates a sectional view of a control valve of the single structural brake unit of FIG. 1.

To overcome this disadvantage switching valves V1, V2 and V3 are oriented as shown in FIG. 1 and as a result this preferred control arrangement for control valve 4 provides the vehicle operator with feel in the brake pedal of the braking process at the wheel brake. This preferred control arrangement is employed with the control valve 4 of FIG. 3. As can be seen from FIG. 1, brake fluid reservoirs 9 and 9" are directly connected with the working chambers of master cylinder 1. Due to this connection, pressure is built up in reservoirs 9 and 9" when operating master cylinder 1. As is usual, reservoirs 9 and 9" have expansion ports 110 and 110" on one side of valve pistons 59 and 60, while on the other side of valve pistons 59 and 60, adjacent auxiliary pistons 61 and 62, feed holes 111 and 111" are provided. As a result, when master cylinder 1 is actuated brake pressure is applied to both sides of valve pistons 59 and 60. This brake pressure is also applied through lines 22 and 23 and valve V2 to one side of control piston 15 and through lines 25 and 26 and valve V3 to the other side of control valve 15 to provide control of control valve 4 to place the booster system into operation. As soon as valve pistons 59 and 60 have crossed expansion ports 110 and 110" the actuating surfaces of valve pistons 59 and 60, which are adjacent to auxiliary pistons 61 and 62, is applied with pressure medium from master cylinder 1 through reservoirs 9 and 9" and feed holes 111 and 111". Thus, in addition to the power provided by the booster system, power generated directly via the brake pedal acts upon the wheel brakes. This results in the vehicle operator having a feel for the braking process at the wheel brakes.

In the diagram of FIG. 1 each intermediate master cylinder 53 and 54 and booster cylinder 8 have a brake fluid reservoir 9, 9' and 9". As a result of the orientation in the intermediate master cylinders and the brake booster cylinder all three brake fluid reservoirs 9, 9' and 9" are situated at about the same height. Thus, there is needed only one single brake fluid reservoir and the brake fluid lines to the individual reservoirs can be dispensed with by providing corresponding housing bores. Furthermore, FIG. 1 shows a control valve 4 controlling the vacuum cylinder 6' of the brake booster. According to the invention this control valve 4 is integrated into one unit with the intermediate master cylinders 53, 54, the booster cylinder 8, and the vacuum cylinder 6'.

Figure 2:
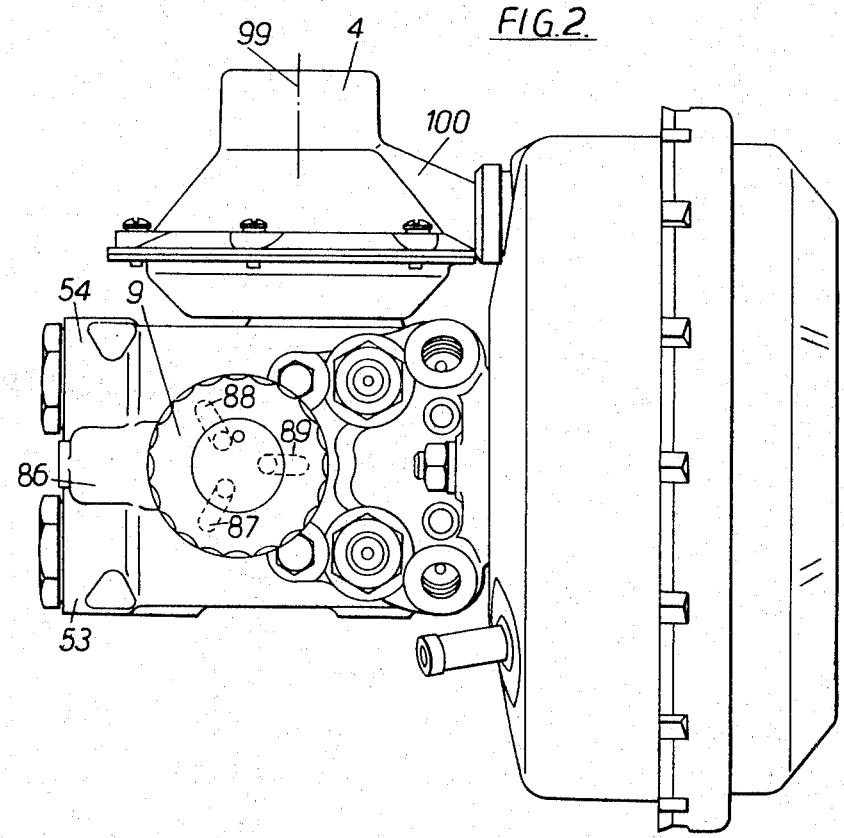
FIG. 2 illustrates a plan view of the single structural brake unit of FIG. 1.

For a detailed explanation reference is now made to FIG. 2. FIG. 2 illustrates the two intermediate master cylinders 53 and 54 which are arranged on both sides of the booster cylinder with the longitudinal axis of master cylinders 53 and 54 and booster cylinder 8 being in a parallel relationship with each other and master cylinders 53 and 54 being oriented with respect to cylinder 8 such that the stroke of the piston of master cylinders 53 and 54 is opposite to the stroke of the piston 86. Brake fluid reservoir 9 is located above the booster piston 86, said brake fluid reservoir 9 supplying the intermediate master cylinders 53 and 54 and the booster cylinder 86 with brake fluid via the housing ducts 87, 88 and 89 represented in dotted lines.

The brake fluid reservoir 9 furthermore remains in connection with an annular chamber between two seals of an outer control piston of the control valve 4. This feature can be seen in FIG. 3. FIG. 3 again shows intermediate master cylinders 53 and 54 and the booster cylinder 8 as well as the control pistons 14 and 15 which actuate control valve 4. The outer control piston 15 comprises two guiding elements 90 and 91 with seals 92 and 93. A connecting element 94 of smaller diameter is provided between the guiding elements 90 and 91 so that an annular chamber 95 is created between the guiding elements. Chamber 95 is sealed from intermediate master cylinder 53, and, hence, its associated brake circuit, by seal 92 while chamber 95 is sealed from intermediate master cylinder 54, and, hence, its associated brake circuit, by seal 93. A bore 96 leads from this annular chamber 95 to a pressureless chamber behind the seal of booster piston 86 of booster cylinder 8. This pressureless chamber is marked 97 in FIG. 1. A further bore 98 leads from the pressureless chamber 97 upwards to the brake fluid reservoir. This connection has the effect that upon a defect of either one of seals 92 or 93, but not both at the same time, the pressure of the associated one of the brake circuits is reduced to the outside pressure that is, that brake fluid of the associated one of the brake circuits is coupled to the reservoir. Thus, the driver can notice a defect, be it by a bigger brake pedal travel distance or by a warning device which responds to the pressure difference in both brake circuits. This is an effective warning arrangement of a defect in one of the seals 92 or 93 and will enable braking of the vehicle to enable repair of the defective seal, since one of the brake circuits will still be operative due to the fact that the likelihood of both seals 92 and 93 failing at the same time is extremely small.

Figure 4:
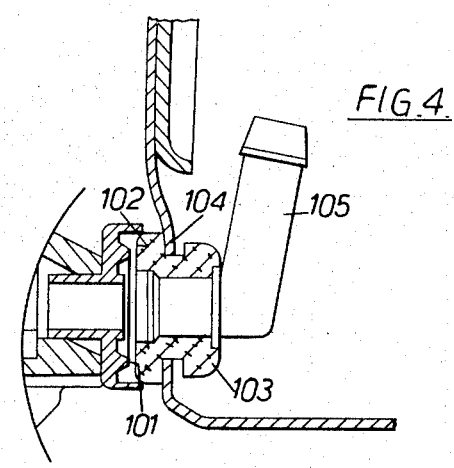
FIG. 4 illustrates a cross sectional view of a detail of the single structural brake unit of FIG. 2.

The fact that control valve 4 is arranged approximately vertically to the housing of intermediate master cylinder 54 with its central axis 99 oriented as seen in FIG. 2 contributes to form a brake unit which is as compact as possible. Thus, an air outlet 100 of the control valve 4 can be arranged in parallel with the axis of the intermediate master cylinder 54. The air outlet 100 is rated such that upon connection of the complete brake unit with the vacuum cylinder 6' the air outlet — as shown in FIG. 4 — presses with a sealing edge 101 against a sealing surface 102 of a seal 103 in a bore 104 of the vacuum cylinder 6'.

According to the invention the seal 103 is formed as a plug for a hollow cylinder which extends to both sides in a torus-like manner. Thus, seal 103 can be butted into bore 104 and at the same time it is able to sealingly support a pipe 105 which leads to the air chamber of brake booster 6 via a non-illustrated flexible connection.

While we have described above the principles of our invention in connection with specific apparatus it is to be clearly understood that this description is made only by way of example and not as a limitation to the scope of our invention as set forth in the objects thereof and in the accompanying claims.

We claim:
1. A multi-circuit brake system comprising:
   a multi-circuit brake pedal actuated master cylinder;
   a vacuum brake booster including
      a pressure sensitive chamber,
      a pressure sensitive piston disposed in said chamber,
      a booster cylinder,
      a booster piston disposed in said booster cylinder, said booster piston being connected to said pressure sensitive piston to control the movement of said booster piston, and
      a booster control valve coupled to each circuit of said master cylinder and said chamber to control the movement of said pressure sensitive piston;
   a plurality of intermediate master cylinders each containing a control piston coupled to control wheel brake cylinders of a different one of said multi-circuits and coupled in common to said booster cylinder to enable said booster piston to control the movement of each of said control pistons;
   a single structural unit containing said plurality of intermediate master cylinders and said booster cylinder, said plurality of intermediate master cylinders being disposed in said structural unit to have their longitudinal axis disposed in a parallel relationship with respect to each other and the longitudinal axis of said booster cylinder;
   said plurality of intermediate master cylinders being oriented with respect to said booster cylinder within said structural unit so that the stroke of each of said control pistons is opposite to the stroke of said booster piston;
   a single brake fluid reservoir disposed in brake fluid communication with said structural unit; and
   ducts disposed in said structural unit to supply brake fluid from said reservoir to each of said intermediate master cylinders and said booster cylinder;
   said booster control valve including a central axis and an air outlet, said booster control valve being disposed as an integral part of said structural unit so that said central axis is approximately perpendicular to the longitudinal axis of said intermediate master cylinders and said air outlet is approximately parallel to the longitudinal axis of said booster cylinder;
   said booster control valve further including
      a housing formed in said structural unit,
      an outer control piston disposed in said housing, and
      a pair of spaced seals associated with said housing and said outer control piston to provide an annular chamber therebetween; and
   said structural unit including
      means therein to connect said annular chamber with said reservoir.
2. A system according to claim 6, wherein said means includes
   bores in said structural unit.
3. A system according to claim 7, further including
   a seal having a plug-like configuration to engage an aperture of said pressure sensitive chamber, and
   wherein said air outlet includes
      a sealing edge which rests against a sealing surface of said seal.

* * * * *